Figure 1:
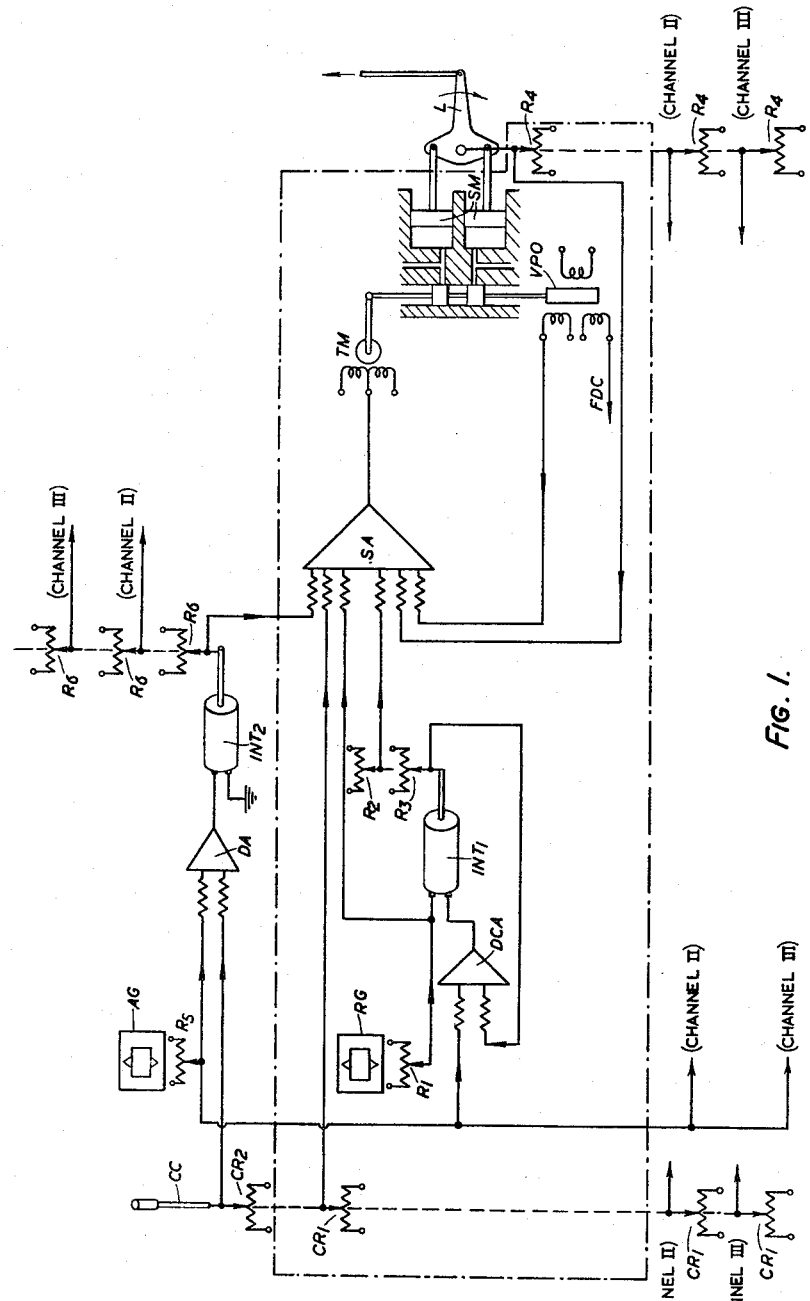

United States Patent Office 3,098,627
Patented July 23, 1963

3,098,627
AUTOMATIC STABILIZING APPARATUS
FOR AIRCRAFT
Ian Kennan Bertram Lasbrey, Belfast, Northern Ireland, assignor to Short Brothers & Harland Limited, Belfast, Northern Ireland
Filed May 23, 1960, Ser. No. 31,112
11 Claims. (Cl. 244—77)

The use in an aircraft control system of stabilising apparatus in which signals derived from a rate gyroscope are integrated to provide a measure of displacement from a datum attitude, is unsatisfactory by reason of the error introduced by friction or other spurious torque acting on the pivots of the gyroscope, as the result of which error integrated signals continue to be produced when the system is nominally at rest. A possible consequence of this defect is that the pilot of an aircraft may find that to maintain a given attitude for an appreciable length of time it is necessary for him to continue to move the control column in a direction dependent upon the sense of the spurious signal initiated by the gyroscope.

The present invention has for its object to provide an improved aircraft stabilizing apparatus for use in conjunction with an automatic pilot without the disadvantages above referred to, and for this purpose it provides apparatus comprising in combination, in respect of a selected control axis (e.g. in relation to pitch, roll or yaw), means for integrating signals derived from multiplicated rate gyroscopes all responsive to accelerations about the same control axis, means for comparing the respective integrated signals with the output signal of a single attitude gyroscope which is used to monitor all three of such integrated output signals, means for supplying each corrected signal to a servo-motor amplifier, where they are added before translation into a mechanical movement, and means for applying the movements of the multiplicated servo-motors to the appropriate organ for control about the selected control axis.

In addition the invention provides means whereby the output of the attitude gyroscope is compared with a signal proportional to the position of the pilot's control column and means for integrating the difference between these two signals, namely the error between actual attitude and demanded attitude, this integration being preferably effected by electro-mechanical means, whereby a limit can be imposed on the maximum rate of change of integrator output signal. This integrated signal is also fed to the above mentioned servo-motor amplifier. Thus, the attitude of the aircraft corresponds exactly to the angle at which the control column is held, returning to this position no matter what external forces act on the aircraft.

Alternatively, to provide a higher degree of safety, the multiplicated integrated rate gyroscope signals, i.e. the generated aircraft attitude signals, can be compared with the control column position, as measured by multiplicated pick-offs, the difference between these two sets of signals, viz: the error between actual aircraft attitude and demanded attitude, being integrated and fed to the above mentioned servo-motor amplifier.

A further feature of this invention is an arrangement whereby, control of the aircraft attitude can be provided when demanded from a source other than the pilot's control column. This signal source may be either within the aircraft or remote, controlled by radio link from another aircraft, or a ground source for reasons of blind or automatic landing of the aircraft, and is independent of external moments applied to the aircraft, e.g. by gusts.

Figure 2:
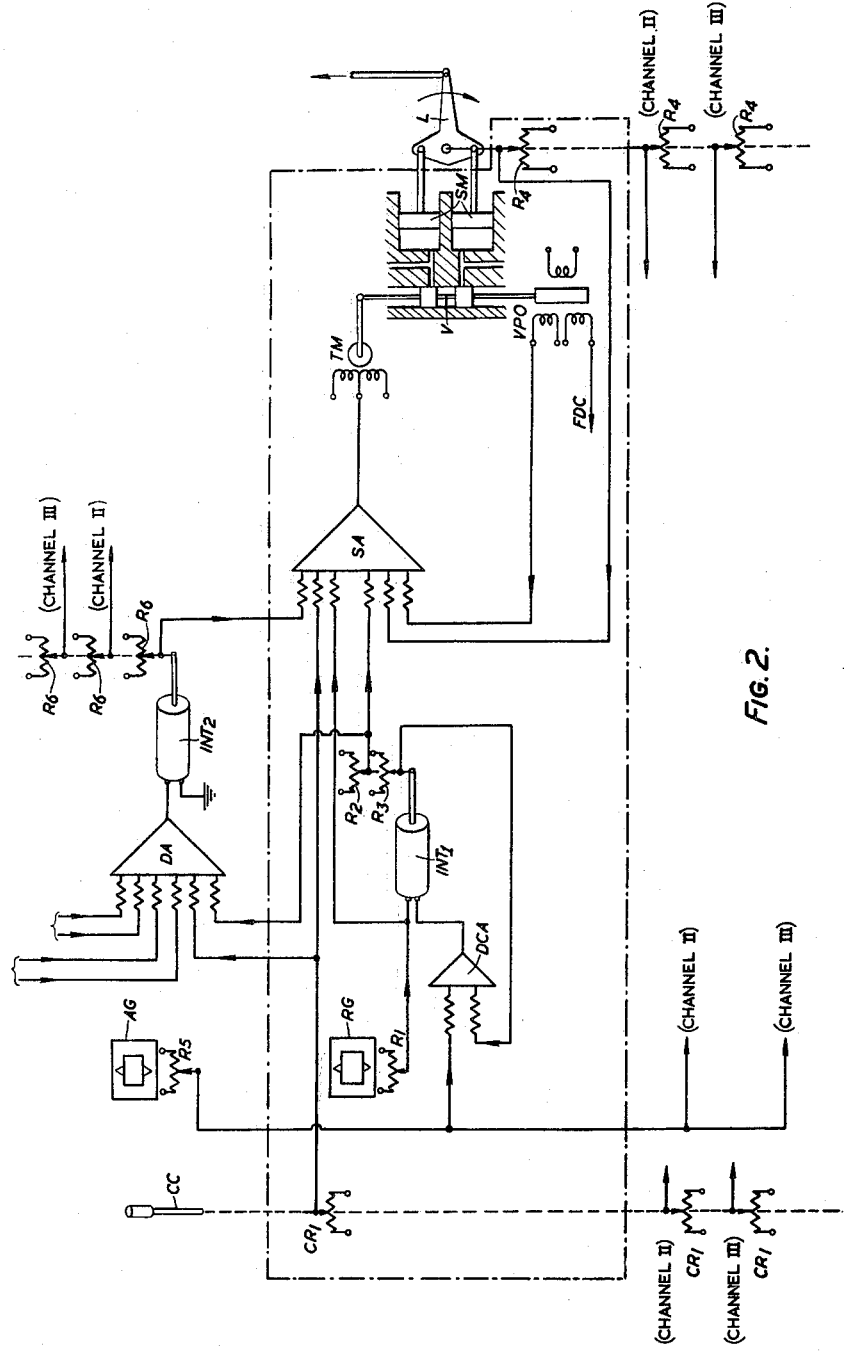

The manner in which the invention may be carried into effect is hereinafter described with reference to the accompanying drawings, in which FIGS. 1 and 2 are diagrams respectively illustrating two alternative forms of stabilising apparatus, incorporating triplicated rate gyroscopes and control circuits. In each figure the diagram includes only the apparatus concerned with stability with reference to a single control axis, which for the purpose of this description is assumed to be that relating to control in pitch, and it will be understood that a complete apparatus for providing stability in roll and yaw also, will be a triplicated version of the pitch stability apparatus illustrated. The circuits relating to the three rate gyroscopes responsive to accelerations, or rate of change in attitude in pitch are designated in the drawing as Channel I, Channel II and Channell III; the circuit of Channel I is illustrated fully, but for the sake of simplicity Channels II and III are omitted except insofar as concerns their connections with the circuit of "attitude error" integrator output and attitude gyroscope monitoring signals, the pilot's control column, and the pitch control organ, and it will be understood that they are identical with Channel I as shown within the chain-dotted line.

In each channel the apparatus includes an electric spring rate gyroscope RG associated with a rheostat $R_1$, connected to a servo-amplifier SA and also to an integrator $INT_1$ the output of which is fed via a rheostat $R_2$ to said servo-amplifier SA.

The output signal from the afore-mentioned servo-amplifier SA drives the torque motors TM of the respective Channels I, II and III. Each torque motor TM, controlling the displacement of the hydraulic control valve V of the respective electro-hydraulic servo-motor SM the output lever L of which is common to the servo-motors SM of all three channels, drives the aircraft control organ through a mechanical connection. Driven by the output lever L so as to produce a signal proportional to the displacement thereof, is a rheostat $R_4$ which feeds back a servo-motor displacement signal to the said servo-amplifier SA.

In addition, the displacement of the control valve V is monitored by a displacement pick-off VPO and its signal is fed back as an approximation to a servo-motor rate of displacement signal to said servo-amplifier SA and also at FDC to a fault-detection circuit such as that which is disclosed in the copending application of Flindt, Serial No. 25,954, filed May 2, 1960.

In parallel with the three channels is a further circuit including an attitude gyroscope AG, and an output rheostat $R_5$ connected through a differencing amplifier DA (hereinafter referred to) with an integrator $INT_2$ which integrates the difference of the output signals from the gyroscope AG and control columm rheostate $CR_2$ and feeds them through the rheostat $R_6$ to the servo-amplifiers SA of the respective Channels I, II and III. Said integrator $INT_2$ preferably operates electro-mechanically and thus by the insertion of a suitable gear-ratio between it and the rheostat $R_6$ the maximum rate of change of signal is limited.

Rheostats $CR_1$, operated by the pilot's control column CC are connected to the servo-amplifiers SA of the respective channels.

Associated with each rate gyroscope RG is a rheostat $R_1$, which is also connected to the servo-amplifier SA and to the integrator $INT_1$, which latter drives the rheostats $R_2$ and $R_3$. The rheostat $R_2$ feeds a signal to the servo-amplifier SA and the rheostat $R_3$ feeds a signal to the drift correction amplifier DCA where the generated aircraft attitude signal is compared with the measured aircraft attitude as obtained from the attitude gyroscope AG and the afore-mentioned rheostat $R_5$ associated therewith. This difference output of the amplifier DCA adjusts the neutral level of the integrator $INT_1$ to compenstate for rate gyroscope and integrator dead zone hysteresis or other errors.

In order to provide increased safety, the servo-amplifier SA may be provided with a voltage limiter, so that in the event of a failure of the monitoring attitude gyroscope AG, or its rheostat $R_5$, the voltage error fed into the integrator $INT_1$ is limited to a predetermined value.

In the alternative embodiment of the invention which is ilustrated in FIG. 2, the differencing amplifier DA derives its inputs from the triplicated control column rheostats $CR_1$ and the generated aircraft attitude signal from the rheostats $R_2$. The output of the amplifier DA drives the integrator $INT_2$, which feeds signals through the rheostats $R_6$ to the servo-amplifiers SA of the respective Channels I, II and III. The attitude gyroscope AG and its associated rheostat $R_5$ feed only to the drift correction amplifiers DCA of the three channels, whereby the signal from said rheostat $R_5$ is compared with the generated aircraft attitude signal obtained from the rheostat $R_3$, the amplifier output serving to adjust the neutral level of the integrator $INT_1$ in the manner described with reference to FIG. 1. In other respects the system illustrated in FIG. 2 is identical with that shown in FIG. 1.

What I claim as my invention and desire to secure by Letters Patent is:

1. Stabilizing apparatus for an aircraft control system having an output member comprising a plurality of signal transmission channels for commonly controlling said output member; each channel comprising a respective rate gyroscope responsive to the rate of change of attitude of the aircraft about a predetermined axis which axis is the same for all said channels, a respective integrator unit coupled to receive a rate signal derived from the respective said gyroscope, and a respective servo motor coupled to drive the said output member in response to signals applied thereto from the output of the respective said integrator unit; an attitude gyroscope common to all said channels for generating an output signal representative of the attitude of the aircraft about said predetermined axis; and means in each channel for comparing the output signal from the respective integrator unit with the output signal from the attitude gyroscope to generate a correction signal to modify the output signal from the respective integrator unit to reduce errors therein.

2. Apparatus as in claim 1 including means for applying the said correction signal in each channel to the input of the respective channel integrator.

3. Apparatus as in claim 1 wherein said control system has a displaceable input control member, and further comprising means including a common integrator unit for deriving and feeding to the servo motor of each said channel a signal representative of the difference between the output signal of said attitude gyroscope and a signal representative of a displacement of said input control member.

4. Apparatus as in claim 3 wherein each of said channels includes a respective servo amplifier coupled between the respective channel integrator unit and servo motor and the output signal from said common integrator unit is applied to each channel servo amplifier for feeding to the respective servo motor.

5. Apparatus as in claim 1 wherein said control system has a displaceable input control member, and further comprising means including a common integrator unit for deriving and feeding to the servo motor of each said channel a signal representative of the difference between the output signal of the respective channel integrator unit and a signal representative of a displacement of said input control member.

6. Apparatus as in claim 5 wherein each of said channels includes a respective servo amplifier coupled between the respective channel integrator unit and servo motor and the output signal from said common integrator unit is applied to each channel servo amplifier for feeding to the respective servo motor.

7. Apparatus as in claim 1 wherein each of said channels has a respective servo amplifier coupled between the respective channel integrator unit and servo motor.

8. Apparatus according to claim 7, wherein each servo motor includes an electro mechanical input mechanism adapted to be driven by input signals applied thereto and operatively connected to the control valve of a fluid-pressure servo motor the output of which is mechanically coupled to a lever for operating the common output member of the control system.

9. Apparatus according to claim 8, wherein a feed back circuit is included in each channel, for feeding back to the input of the servo amplifier a signal representative of the displacement of the common output member.

10. Apparatus according to claim 8, wherein a circuit is included in each channel for feeding back to the servo amplifier input a signal representative of the position of the servo motor valve.

11. Apparatus according to claim 8, comprising fault-detection means operatively associated with the servo motor valve and actuated by a signal dependent upon the position of said valve.

References Cited in the file of this patent

UNITED STATES PATENTS

| | | |
|---|---|---|
| 2,835,861 | Eckhardt | May 20, 1958 |
| 2,945,647 | Bell | July 19, 1960 |
| 2,953,326 | Bretoi | Sept. 20, 1960 |